(12) United States Patent
Besso et al.

(10) Patent No.: US 10,588,346 B2
(45) Date of Patent: Mar. 17, 2020

(54) HYDROPHOBIC WRAPPER

(71) Applicant: PHILIP MORRIS PRODUCTS S.A., Neuchatel (CH)

(72) Inventors: Clement Besso, Neuchatel (CH); Aurelien Guyard, Pompaples (CH); Mirko Minzoni, Neuchatel (CH); Alen Kadiric, Orpund (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/030,954

(22) PCT Filed: Oct. 15, 2015

(86) PCT No.: PCT/IB2015/057943
§ 371 (c)(1),
(2) Date: Apr. 21, 2016

(87) PCT Pub. No.: WO2016/063180
PCT Pub. Date: Apr. 28, 2016

(65) Prior Publication Data
US 2017/0215475 A1 Aug. 3, 2017

Related U.S. Application Data

(60) Provisional application No. 62/066,068, filed on Oct. 20, 2014.

(51) Int. Cl.
*A24F 47/00* (2006.01)
*A24D 1/02* (2006.01)
(Continued)

(52) U.S. Cl.
CPC ............ *A24F 47/008* (2013.01); *A24D 1/02* (2013.01); *D21H 21/16* (2013.01); *H01M 10/0525* (2013.01); *H01M 2220/30* (2013.01)

(58) Field of Classification Search
None
See application file for complete search history.

(56) References Cited

U.S. PATENT DOCUMENTS 4,107,426 A * 8/1978 Gordon ............. A61F 13/00991
229/5.85
4,341,228 A 7/1982 Keritsis et al.
(Continued)

FOREIGN PATENT DOCUMENTS

CA 2300715 A1 9/2000
CH 691156 A5 5/2001
(Continued)

OTHER PUBLICATIONS

International Search Report and Written Opinion from PCT/IB2015/057943 issued by the European Patent Office, dated Jan. 21, 2016; 11 pgs.

(Continued)

*Primary Examiner* — Phu H Nguyen
(74) *Attorney, Agent, or Firm* — Mueting, Raasch & Gebhardt P.A.

(57) ABSTRACT

A smoking article (10) includes a tobacco substrate (20) comprising at least 15% humectant and a hydrophobic paper wrapper (40) disposed about the tobacco substrate. The paper wrapper (40) is hydrophobic due to hydrophobic groups covalently bonded to the paper.

15 Claims, 1 Drawing Sheet

(51) Int. Cl.
*D21H 21/16* (2006.01)
*H01M 10/0525* (2010.01)

(56) References Cited

U.S. PATENT DOCUMENTS

| | | | |
|---|---|---|---|
| 5,143,099 A | | 9/1992 | Le Gars et al. |
| 5,374,335 A | | 12/1994 | Lindgren et al. |
| 5,584,306 A | | 12/1996 | Beauman et al. |
| 5,707,927 A | | 1/1998 | Park et al. |
| 5,724,998 A | | 3/1998 | Gellatly et al. |
| 5,893,372 A | * | 4/1999 | Hampl, Jr. ............... A24D 1/02 131/280 |
| 6,216,706 B1 | | 4/2001 | Kumar et al. |
| 6,286,516 B1 | | 9/2001 | Bowen et al. |
| 6,378,528 B1 | * | 4/2002 | Beeson ................ A24B 15/28 131/194 |
| 7,270,727 B2 | | 9/2007 | Varnell |
| 2003/0073363 A1 | * | 4/2003 | Ono ..................... B41M 5/5236 442/153 |
| 2003/0131860 A1 | * | 7/2003 | Ashcraft ................ A24D 1/025 131/365 |
| 2004/0084165 A1 | | 5/2004 | Shannon et al. |
| 2004/0134631 A1 | * | 7/2004 | Crooks ................ A24D 1/025 162/139 |
| 2008/0216854 A1 | | 9/2008 | Nicholls et al. |
| 2011/0014458 A1 | | 1/2011 | Stinga et al. |
| 2011/0180082 A1 | | 7/2011 | Banerjee et al. |
| 2013/0160779 A1 | | 6/2013 | Chida et al. |
| 2013/0236647 A1 | | 9/2013 | Samain et al. |
| 2015/0296875 A1 | | 10/2015 | Camus |

FOREIGN PATENT DOCUMENTS

| | | |
|---|---|---|
| CN | 1149417 A | 5/1997 |
| CN | 2266271 Y | 11/1997 |
| CN | 1273022 A | 11/2000 |
| CN | 1306401 A | 8/2001 |
| CN | 1132533 C | 12/2003 |
| CN | 1742551 A | 3/2006 |
| CN | 2847820 Y | 12/2006 |
| CN | 101084732 A | 12/2007 |
| CN | 201001304 Y | 1/2008 |
| CN | 101248745 A | 8/2008 |
| CN | 101283667 A | 10/2008 |
| CN | 101965263 A | 2/2011 |
| CN | 102613702 A | 8/2012 |
| EP | 0 419 974 A2 | 4/1991 |
| EP | 1 044 615 A1 | 10/2000 |
| JP | 2660947 | 10/1997 |
| JP | 2010-506594 | 3/2010 |
| JP | 2013070693 A | 4/2013 |
| JP | 5608730 B2 | 10/2014 |
| KR | 10-2004-0034696 | 4/2004 |
| KR | 10-0636287 | 10/2006 |
| KR | 10-2009-0130031 | 12/2009 |
| TW | 200422490 A | 11/2004 |
| TW | 201132301 A | 10/2011 |
| TW | 201208588 A | 3/2012 |
| TW | 201438606 A | 10/2014 |
| WO | WO 2008/108889 A1 | 9/2008 |
| WO | WO 2011/114530 A1 | 9/2011 |
| WO | WO 2012/045468 A1 | 4/2012 |

OTHER PUBLICATIONS

International Preliminary Report on Patentability for PCT/IB2015/057943, issued by the International Bureau of WIPO, dated May 4, 2017; 7 pgs.
Office Action from corresponding Chinese Application No. 201580003693.2, dated Dec. 26, 2017, 20 pgs., including English Translation.
Papermaking Chemicals, Zhang Guanghua, pp. 250-254, China Petrochemical Press, $1^{st}$ Edition, Including English Translation; 13 pgs.
Chinese Office Action for CN 201580003693.2, issued by the Chinese Patent Office dated May 16, 2018; including English Translation: 29 pgs.
Official Notification for the Opinion of Examination from the Taiwan Patent Office for Taiwanese Patent Application No. 104132105, dated Jan. 17, 2019; including English Translation: 12 pgs.

* cited by examiner

HYDROPHOBIC WRAPPER

This application is the § 371 U.S. National Stage of International Application No. PCT/IB2015/057943, filed 15 Oct. 2015, which claims the benefit of U.S. Provisional Application No. 62/066,068, filed 20 Oct. 2014, each of which are incorporated by reference herein in their entireties.

The present disclosure relates to paper used in smoking articles, wherein the paper has a hydrophobic surface and is utilized with tobacco substrate having a high humectant level.

Combustible smoking articles, such as cigarettes, typically comprise a cylindrical rod of tobacco cut filler surrounded by a wrapper and a cylindrical filter axially aligned in an abutting end-to-end relationship with the wrapped tobacco rod. The cylindrical filter typically comprises a filtration material circumscribed by a plug wrap. The wrapped tobacco rod and the filter are joined by a band of tipping wrapper, normally formed of a paper material that circumscribes the entire length of the filter and an adjacent portion of the wrapped tobacco rod. A cigarette is employed by a consumer by lighting one end thereof and burning the shredded tobacco rod.

The smoker then receives mainstream smoke into their mouth by drawing on the mouth end or filter end of the cigarette.

Some smoking articles comprises an aerosol generating substrate containing tobacco which is heated rather than combusted when it is consumed. Known heated smoking articles include, for example, smoking articles in which an aerosol is generated by electrical heating or by the transfer of heat from a combustible fuel element or a heat source to an aerosol generating substrate. During smoking, volatile compounds are released from the aerosol generating substrate by heat transfer from the heat source and entrained in air drawn through the smoking article. As the released compounds cool they condense to form an aerosol that is inhaled by the consumer. Also known are smoking articles in which a nicotine-containing aerosol is generated from a tobacco-containing material or other nicotine source, without combustion or heating, for example through a chemical reaction.

Many smoking articles generally comprise a filter aligned in end-to-end relationship with a tobacco rod. Some smoking articles include a filter segment with functional materials that capture or convert components of the mainstream smoke or aerosol as the mainstream smoke or aerosol is being drawn through the filter. Such functional materials are known and include, for example, sorbents, catalysts and flavourants.

Paper that is used to wrap the tobacco substrate can absorb humectant, water and other compounds found in the mainstream smoke or aerosol passing through the smoking article, or humidity or moisture surrounding the paper. The absorbed liquid stains or weakens the paper and negatively affects the appearance and structural integrity of the smoking article. Heated smoking articles or aerosol-generating articles are particularly susceptible to wetting and breakage due to the high levels of humectant in the tobacco substrate of these heated smoking articles or aerosol-generating articles.

It would be desirable to provide a mechanically stable smoking article that has a high humectant level. It is desirable to reduce the amount of wetting of the paper wrapper surrounding the aerosol-generating substrate during use of the aerosol-generating article.

It would be desirable to provide a smoking article that included paper that did not readily absorb water or compounds found in the mainstream smoke or aerosol passing through the smoking article or found in the environment surrounding the paper. It would also be desirable that this hydrophobic paper not affect the taste of the smoke or aerosol generated by the smoking article.

According to a first aspect, a smoking article includes a tobacco substrate having at least 15% humectant and a paper wrapper disposed about the tobacco substrate. The paper wrapper exhibits hydrophobic properties due to the hydrophobic groups that are covalently bonded to the paper.

In another aspect, the hydrophobic paper is produced by a process comprising the steps of: applying a liquid composition comprising a fatty acid halide to at least one surface of a paper, and maintaining the surface at a temperature of about 120° C. to about 180° C. The fatty acid halide reacts in situ with protogenic groups of material in the paper resulting in the formation of fatty acid esters.

In a further aspect, method of forming a smoking article includes reacting a fatty acid chloride with cellulosic material of the paper to form a hydrophobic paper.

In another aspect, a method for making hydrophobic paper wrapper comprises the steps of: applying a liquid composition comprising a fatty acid halide to at least one surface of a paper, and maintaining the surface at a temperature of about 120° C. to about 180° C. The fatty acid halide reacts in situ with protogenic groups of material in the paper resulting in the formation of fatty acid esters.

In a further aspect, an aerosol-generating system includes an aerosol-generating device comprising a heating element and an aerosol-generating article including a hydrophobic paper wrapper surrounding an aerosol-generating substrate having at least 15% humectant. The aerosol-generating device is configured to releasably receive an aerosol-generating article and the heating element provides heat to the aerosol-forming substrate in the aerosol-generating article.

Smoking articles that include a hydrophobic paper wrapper can reduce wetting and absorption of water or humectants in the smoke or aerosol passing through the smoking article. As a result, visible staining and physical weakening of the wrapper portion of the smoking article may be reduced even when a high level of humectant is included in the tobacco substrate.

Smoking articles in accordance with the present disclosure may be filter cigarettes or other smoking articles in which tobacco material is combusted to form smoke. For example, the aerosol-generating substrate may comprise a tobacco rod and the mouthpiece may comprise a filter. A tipping wrapper joins the filter to the tobacco substrate or rod. The term "smoking article" is used herein to indicate cigarettes, cigars, cigarillos and other articles in which a smokeable material, such as a tobacco, is lit and combusted to produce smoke. The term "smoking article" also includes an aerosol-generating article in which an aerosol comprising nicotine is generated by heat without combusting the aerosol-forming substrate, such as tobacco substrate.

The term "tobacco substrate" or "aerosol-generating substrate" includes a rod of tobacco formed of shredded tobacco or tobacco cut filler, or it may include reconstituted tobacco or cast leaf tobacco, or a mixture of both. The tobacco substrate can be connected to the mouthpiece or filter in an end-to-end relationship, as further discussed below.

The term "mouthpiece" is used herein to indicate the portion of the smoking article that is designed to be contacted with the mouth of the consumer. The mouthpiece can be the portion of the smoking article that can includes a filter, or in some cases the mouthpiece can be defined by the extent of the tipping wrapper. In other cases, the mouthpiece can be defined as a portion of the smoking article extending about 40 mm from the mouth end of the smoking article, or extending about 30 mm from the mouth end of the smoking article. Alternatively, smoking articles according to the present disclosure may be articles in which an aerosol-generating substance, such as tobacco, is heated to form an aerosol rather than combusted. In one type of heated smoking article, an aerosol generating substance is heated by one or more electrical heating elements to produce an aerosol. In another type of heated smoking article, an aerosol is produced by the transfer of heat from a combustible or chemical heat source to a physically separate aerosol generating substrate, which may be located within, around or downstream of the heat source. The present disclosure further encompasses smoking articles in which a nicotine-containing aerosol is generated from a tobacco material, tobacco extract, or other nicotine source, without combustion, and in some cases without heating, for example through a chemical reaction.

The term "aerosol-generating article" is used herein to refer to heated smoking articles or smoking articles that are not cigarettes, cigars, cigarillos, or that combust a tobacco substrate to produce smoke. Smoking articles according to the invention may be whole, assembled smoking devices or components of smoking devices that are combined with one or more other components in order to provide an assembled device for producing an aerosol, such as for example, the consumable part of a heated smoking device or aerosol-generating article.

Typically, an aerosol-generating device comprises: a heat source; an aerosol-forming substrate (such as a tobacco substrate); at least one air inlet downstream of the aerosol-forming substrate; and an airflow pathway extending between the at least one air inlet and the mouth-end of the article. The heat source is preferably upstream from the aerosol-forming substrate. In many embodiments the heat source is integral with the aerosol-generating device and a consumable aerosol-generating article is releasably received within the aerosol-generating device.

The heat source may be a combustible heat source, a chemical heat source, an electrical heat source, a heat sink or any combination thereof. The heat source may be an electrical heat source, preferably shaped in the form of a blade that can be inserted into the aerosol-forming substrate. Alternatively, the heat source may be configured to surround the aerosol-forming substrate, and as such may be in the form of a hollow cylinder, or any other such suitable form. Alternatively, the heat source is a combustible heat source. As used herein, a combustible heat source is a heat source that is itself combusted to generate heat during use, which unlike a cigarette, cigar or cigarillo, does not involve combusting the tobacco substrate in the smoking article. Preferably, such a combustible heat source comprises carbon and an ignition aid, such as a metal peroxide, superoxide, or nitrate, wherein the metal is an alkali metal or alkaline earth metal.

The terms "upstream" and "downstream" refer to relative positions of elements of the smoking article described in relation to the direction of mainstream smoke or aerosol as it is drawn from a tobacco substrate or aerosol-generating substrate and through the and mouthpiece.

The term "mainstream smoke" is used herein to indicate smoke produced by combustible smoking articles, such as cigarettes, and aerosols produced by non-combustible smoking articles as described above. Mainstream smoke flows through the smoking article and is consumed by the user.

The term "wrapper" or "paper wrapper" are interchangeable and refer to a wrapping material that circumscribes a tobacco substrate to maintain the shape of the tobacco substrate and is formed of paper or other material and optional filler materials. The wrapper or paper wrapper is hydrophobic.

The term "hydrophobic" refers to a surface exhibiting water repelling properties. One useful way to determine this is to measure the water contact angle. The "water contact angle" is the angle, conventionally measured through the liquid, where a liquid/vapour interface meets a solid surface. It quantifies the wettability of a solid surface by a liquid via the Young equation.

The present disclosure provides a hydrophobic paper wrapper (that is, having only a hydrophobic inner surface or at least a hydrophobic inner surface, or having only a hydrophobic outer surface or at least a hydrophobic outer surface, or having both a hydrophobic inner surface and a hydrophobic outer surface) disposed about or surrounding the tobacco substrate.

It is contemplated that the hydrophobic paper wrapper can reduce and prevent formation of spots on a smoking article that are visible to a consumer. It has been observed that spots can appear on a smoking article upon storage in a humid environment. The spots can be caused by absorption of water or humectant, including any coloured substances that are suspended or dissolved, into the web of cellulosic fibers that constitutes the paper wrapper. Without being bound by any theory, the water or humectant interacts with the cellulosic fibers of the paper and alters the organization of the fibers resulting in a local change in the optical properties, such as brightness, color, and opacity, and mechanical properties, such as tensile strength, permeability of the paper wrapper.

The wrapper is the portion of the smoking article that is disposed about the tobacco rod or tobacco substrate to help maintain the cylindrical form of the tobacco substrate. This wrapper can exhibit a range of permeability including not being permeable. Permeability of cigarette paper is determined by utilizing the International Standard test method ISO 2965:2009 and the result is presented as cubic centimetres per minute per square centimetre and referred to as "CORESTA units".

In many embodiments, the permeability of the untreated wrapper (that is, with no hydrophobic treatment) can be from about 0 CORESTA units to about 300 CORESTA units, or from about 20 CORESTA units to 75 CORESTA units, or about 10 CORESTA units or less, about 5 CORESTA units or greater, or about 1 CORESTA units or less. In some configurations, the permeability of the treated wrapper is in a range from about 1 to about 10 CORESTA units, about 5 to about 20 CORESTA units or about 1 to about 5 CORESTA units.

In various embodiments, the paper wrapper can be formed of any suitable hydrophobic material. In many embodiments the paper wrapper is formed of a material with pendent proteogenic groups. The term "protogenic" refers to a group that is able to donate a hydrogen or a proton in a chemical reaction. Preferably, the protogenic groups are reactive hydrophilic groups such as but not limited to a hydroxyl group (—OH), an amine group (—NH$_2$), or a sulfhydryl group (—SH$_2$). The invention will now be described, by way of example, with reference to wrappers comprising hydroxyl groups. Material with pendent hydroxyl groups includes cellulosic material such as paper, wood, textile, natural as well as artificial fibers. The paper wrapper can also include one or more filler materials, for example calcium carbonate. The term "wrapper" as used herein encompasses "paper wrapper", "cigarette wrapper", as well as any wrapper used to enclose and form a heated smoking article, an aerosol-generating article or combustible smoking article, and particularly the tobacco substrate or aerosol-generating substrate.

A wrapper described herein, including any hydrophobic treatments, can have any suitable basis weight. The basis weight of a wrapper can be in a range from about 20 to about 50 grams per square meter or from about 20 to about 40 grams per square meter. A wrapper can have any suitable thickness. The thickness of a wrapper can be in a range from about 30 to about 80 micrometres or from about 30 to about 60 micrometres, or from about 40 to 50 micrometers.

In many embodiments, the thickness of the wrapper allows the hydrophobic groups or reagent applied to one surface to spread onto the opposing surface effectively providing similar hydrophobic properties to both opposing surfaces. In one example, the thickness of the wrapper was about 43 micrometres and both surfaces were rendered hydrophobic by the gravure (printing) process using stearoyl chloride as the hydrophobic reagent to one surface.

Accordingly, although many of the benefits of the invention only requires that one of the two major surfaces, that is, either the inner surface or the outer surface, exhibits the hydrophobic properties, it is contemplated that paper which exhibits hydrophobic properties on both major surfaces can also be used similarly. Preferably, only or at least the outer surface is hydrophobic. Therefore, the invention encompasses various applications in which the wrapper comprises at least one hydrophobic surface.

The hydrophobic surface of a wrapper can also inhibit the transfer, absorption and accumulation of humectant, water and other dissolved or suspended substances to the wrapper that can form visible spots on the wrapper of smoking articles or weaken the wrapper. Essentially, the hydrophobic surface reduces or prevents the staining of the wrapper by water, humectant and other dissolved or suspended substances.

The hydrophobic wrapper can also inhibit the transfer, absorption and accumulation of humectant, water and staining of the wrapper that occurs when the smoking article is stored or utilized in a humid environment, particularly where the humidity is very high (e.g., relative humidity greater than 70%, 80%, 90%, 95%, 99%) or when the smoking article is stored for an extended period, (e.g., more than three weeks, two months, three months, or six months), or a combination of such conditions.

The hydrophobic nature of the wrapper can also prevent or reduce the incidence of deformation or disintegration of the mouthpiece of a smoking article where moisture, or humectant interacts with the wrapper. When humectant or water penetrates the wrapper surface and is absorbed, the structure of the wrapper is weakened, effectively lowering the tensile strength of the wrapper and leading to easy tearing or collapse of wrapper or tobacco rod.

In some embodiments, the material or method to create the hydrophobic wrapper does not substantially affect the permeability of the wrapper. Preferably, the reagent or method to create the hydrophobic wrapper changes the permeability of the wrapper (as compared to the untreated wrapper material) by less than about 10% or less than about 5%.

In various embodiments, the hydrophobic surface of the wrapper has a Cobb water absorption (ISO535:1991) value (at 60 seconds) of less than about 30 $g/m^2$, less than about 20 $g/m^2$, less than about 15 $g/m^2$, or less than about 10 $g/m^2$.

In various embodiments, the hydrophobic surface of the wrapper has a water contact angle of of at least about 90 degrees, at least about 95 degrees, at least about 100 degrees, at least about 110 degrees, at least about 120 degrees, at least about 130 degrees at least about 140 degrees, at least about 150 degrees, at least about 160 degrees, or at least about 170 degrees. Hydrophobicity is determined by utilizing the TAPPI T558 om-97 test and the result is presented as an interfacial contact angle and reported in "degrees" and can range from near zero degrees to near 180 degrees. Where no contact angle is specified along with the term hydrophobic, the water contact angle is at least 90 degrees.

In preferred embodiments, the inner surface of the wrapper has a water contact angle of at least about 90 degrees, at least about 95 degrees, at least about 100 degrees, at least about 110 degrees, at least about 120 degrees, at least about 130 degrees at least about 140 degrees, at least about 150 degrees, at least about 160 degrees, or at least about 170 degrees. The outer surface may be less hydrophobic than the inner surface in order to facilitate the subsequent processing of the outer surface, for example printing designs on the outer surface, printing treatments for reduced cigarette ignition propensity, or to make it more compatible with certain adhesives. In other embodiments, the outer surface has a water contact angle that is substantially the same as the inner surface, or within about 20 degrees of the contact angle of the inner surface.

The hydrophobic surface can be uniformly present along the length of the wrapper. In some configurations the hydrophobic surface is not uniformly present along the length of the wrapper. For example, the hydrophobic surface may be preferentially present on a portion of the wrapper adjacent to the filter element or mouth piece of the smoking article and not present on an upstream portion of the wrapper. In some embodiments, the hydrophobic surface is not present in the most upstream 25% portion of the wrapper. In some embodiments the hydrophobic surface forms a pattern along all or a portion of the length of the wrapper. Portions of the wrapper this are not hydrophobic can include indicia that may not be easily applied to a hydrophobic surface.

In many embodiments the hydrophobic surface can be formed by printing reagent along the length of the wrapper. Any useful printing methods can be utilized. The reagent can include any useful hydrophobic groups that can be reacted to chemically bond to the wrapper material or pendent groups of the wrapper material.

In many embodiments the hydrophobic surface can be formed by printing reagent along the length of the wrapper. Any useful printing methods can be utilized such as gravure, ink jet and the like. The reagent can include any useful hydrophobic groups that can be covalently bonded to the wrapper material or pendent groups of the paper material.

The hydrophobic surface can be formed with any suitable hydrophobic reagent or hydrophobic group. The hydrophobic reagent is preferably chemically bonded to the paper or pendent protogenic groups of the paper material. In many embodiments the hydrophobic reagent is covalently bonded to the paper or pendent protogenic groups of the paper material. For example, the hydrophobic group is covalently bonded to pendent hydroxyl groups of cellulosic material forming the paper wrapper. A covalent bond between structural components of the paper and the hydrophobic reagent can form hydrophobic groups that are more securely attached to the paper material than simply disposing a coating of hydrophobic material on the paper wrapper surface. By chemically bonding the hydrophobic reagent at the molecular level in situ rather than applying a layer of hydrophobic material in bulk to cover the surface allows the permeability of the paper to be better maintained, since a coating tends to cover or block pores in the paper and reduce the permeability. Chemically bonding hydrophobic groups to the paper in situ can also reduce the amount of material required to render the surface of the paper hydrophobic. The term "in situ" as used herein refers to the location of the chemical reaction which takes place on or near the surface of the solid material that forms the paper, which is distinguishable from a reaction with cellulose dissolved in a solution. For example, the reaction takes place on or near the surface of paper which comprises cellulosic material in a heterogenous structure. However, the term "in situ" does not require that the chemical reaction takes place directly on a smoking article.

The hydrophobic reagent may comprises an acyl group or fatty acid group. The acyl group or fatty acid group or mixture thereof can be saturated or unsaturated. A fatty acid group (such as a fatty acid halide) in the reagent can react with pendent protogenic groups such as hydroxyl groups of the cellulosic material to form an ester bond covalently bonding the fatty acid to the cellulosic material. In essence, these reactions with the pendent hydroxyl groups can esterify the cellulosic material.

The acyl group or fatty acid group includes a $C_{12}$-$C_{30}$ alkyl (an alkyl group having from 12 to 30 carbon atoms), a $C_{14}$-$C_{24}$ alkyl (an alkyl group having from 14 to 24 carbon atoms) or preferably a $C_{16}$-$C_{20}$ alkyl (an alkyl group having from 16 to 20 carbon atoms). Those skill in the art would understand that the term "fatty acid" as used herein refers to long chain aliphatic, saturated or unsaturated fatty acid that comprises 12 to 30 carbon atoms, 14 to 24 carbon atoms, 16 to 20 carbon atoms or that has greater than 15, 16, 17, 18, 19, or 20 carbon atoms. In various embodiments, the hydrophobic reagent includes an acyl halide, a fatty acid halide, such as, a fatty acid chloride including palmitoyl chloride, stearoyl chloride or behenoyl chloride, a mixture thereof, for example. The in situ reaction between fatty acid chloride and cellulose in the wrapper results in fatty acid esters of cellulose and hydrochloric acid.

Any suitable method can be utilized to chemically bond the hydrophobic reagent or group to the paper wrapper. As one example, an amount of hydrophobic reagent is deposited without solvent at the surface of paper at controlled temperature, for example, droplets of the reagents forming 20-micrometer regularly-spaced circles on the surface. The control of the vapour tension of the reagent can promote the propagation of the reaction by diffusion with the formation of ester bonds between fatty acid and cellulose while continuously withdrawing unreacted acid chloride. The esterification of cellulose is in some cases based on the reaction of alcohol groups or pendent hydroxyl groups of cellulose with an acyl halide, such as an acyl chloride including a fatty acid chloride. The temperature that can be used to heat the hydrophobic reagent depends on the chemical nature of the reagent and for fatty acid halides, it ranges from about 120° C. to about 180° C.

The hydrophobic reagent can be applied to the paper wrapper in any useful amount or basis weight. In many embodiments the basis weight of the hydrophobic reagent is less than about 3 grams per square meter, less than about 2 grams per square meter, or less than about 1 gram per square meter or in a range from about 0.1 to about 3 grams per square meter, from about 0.1 to about 2 grams per square meter, or from about 0.1 to about 1 gram per square meter.

The hydrophobic reagent can be applied or printed on the paper surface and define a uniform or non-uniform pattern.

Preferably the hydrophobic paper wrapper is formed by reacting a fatty acid ester group or a fatty acid group with pendent hydroxyl groups on the cellulosic material of the wrapper to form a hydrophobic surface of the paper. The reacting step can be accomplished by applying a fatty acid halide (such as chloride, for example) which provides the fatty acid ester group or a fatty acid group to chemically bond with pendent hydroxyl groups on the cellulosic material of the paper to form a hydrophobic surface of the wrapper. The applying step can be carried out by loading the fatty acid halide in liquid form onto a solid support, such as a brush, a roller, or an absorbent or non-absorbent pad, and then contacting the solid support with a surface of the wrapper. The fatty acid halide can also be applied by printing techniques, such as gravure, flexography, ink jet, heliography, by spraying, by wetting, or by immersion in a liquid comprising the fatty acid halide. The applying step can deposit discrete islands of reagent forming a uniform or non-uniform pattern of hydrophobic areas on the surface of the paper wrapper. The uniform or non-uniform pattern of hydrophobic areas on the wrapper can be formed of at least about 100 discrete hydrophobic islands, at least about 500 discrete hydrophobic islands, at least about 1000 discrete hydrophobic islands, or at least about 5000 discrete hydrophobic islands. The discrete hydrophobic islands can have any useful shape such as a circle, rectangle or polygon. The discrete hydrophobic islands can have any useful average lateral dimension. In many embodiments the discrete hydrophobic islands have an average lateral dimension in a range from 5 to 100 micrometres, or in a range from 5 to 50 micrometres. To aid diffusion of the applied reagent on the surface, a gas stream can also be applied. Apparatus and processes such as those described in US patent publication 20130236647, incorporated herein by reference in its entirety, can be used to produce the hydrophobic paper wrapper.

According to the invention, a hydrophobic paper wrapper can be produced by a process comprising applying a liquid composition comprising an aliphatic acid halide (preferably a fatty acid halide) to at least one surface of a paper wrapper, optionally applying a gas stream to the surface to aid diffusion of the applied fatty acid halide, and maintaining the surface at a temperature about 120° C. to about 180° C., wherein the fatty acid halide reacts in situ with the hydroxyl groups of the cellulosic material in the paper resulting in the formation of fatty acid esters. Preferably, the wrapper is made of paper, and the fatty acid halide is stearoyl chloride, palmitoyl chloride, or a mixture of fatty acid chlorides with 16 to 20 carbon atoms in the acyl group. The hydrophobic paper produced by a process described hereinabove is thus distinguishable from material made by coating the surface with a layer of pre-made fatty acid ester of cellulose.

The hydrophobic paper wrapper is produced by a process of applying the liquid reagent composition to the at least one surface of a paper at a rate of in a range from about 0.1 to about 3 grams per square meter, or from about 0.1 to about 2 grams per square meter, or from about 0.1 to about 1 gram per square meter. The liquid reagent applied at these rates renders the surface of a paper hydrophobic.

Smoking articles, such as cigarettes and aerosol generating articles, include a tobacco substrate or an aerosol generating substrate that comprises a charge of tobacco circumscribed by a wrapper. The tobacco substrate may comprise any suitable type or types of tobacco material or tobacco substitute, in any suitable form. Preferably the tobacco rod includes flue-cured tobacco, Burley tobacco, Maryland tobacco, Oriental tobacco, specialty tobacco, homogenized or reconstituted tobacco, or any combination thereof. Preferably, the tobacco is provided in the form of tobacco cut filler, tobacco lamina, processed tobacco materials, such as volume expanded or puffed tobacco, processed tobacco stems, such as cut-rolled or cut-puffed stems, homogenized tobacco, reconstituted tobacco, cast leaf tobacco, or blends thereof, and the like. The term "tobacco cut filler" is used herein to indicate tobacco material that is predominately formed from the lamina portion of the tobacco leaf. The terms "tobacco cut filler" is used herein to indicate both a single species of Nicotiana and two or more species of Nicotiana forming a tobacco cut filler blend.

As used herein, the term "homogenised tobacco" denotes a material formed by agglomerating particulate tobacco. Homogenized tobacco may include reconstituted tobacco or cast leaf tobacco, or a mixture of both. The term "reconstituted tobacco" refers to paper-like material that can be made from tobacco by-products, such as tobacco fines, tobacco dusts, tobacco stems, or a mixture of the foregoing. Reconstituted tobacco can be made by extracting the soluble chemicals in the tobacco by-products, processing the leftover tobacco fibers into a sheet, and then reapplying the extracted materials in concentrated form onto the sheet. The term "cast leaf tobacco" is used herein to refer to a product resulting from a process well known in the art, which is based on casting a slurry comprising ground tobacco particles and a binder (for example, guar) onto a supportive surface, such as a belt conveyor, drying the slurry and removing the dried sheet from the supportive surface. Exemplary methods for producing these types of tobacco substrate or aerosol-generating substrates are described in U.S. Pat. Nos. 5,724,998; 5,584,306; 4,341,228; 5,584,306 and 6,216,706. In various embodiments, the homogenised tobacco is formed into a sheet which is crimped, convoluted, folded, or otherwise compressed, before being wrapped to form a rod. For example, sheets of homogenised tobacco material for use in the invention may be crimped using a crimping unit of the type described in CH-A-691156, which comprises a pair of rotatable crimping rollers. However, it will be appreciated that sheets of homogenised tobacco material for use in the invention may be textured using other suitable machinery and processes that deform or perforate the sheets of homogenised tobacco material.

The tobacco substrate or aerosol-generating substrate used in heated smoking articles or aerosol-generating articles generally includes a higher level of humectant(s) than combusted smoking articles, such as cigarettes. Humectants can also be referred to as an "aerosol former". An aerosol former is used to describe any suitable known compound or mixture of compounds that, in use, facilitates formation of an aerosol and that is substantially resistant to thermal degradation at the operating temperature of the aerosol-generating substrate. Suitable humectants or aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred humectants or aerosol formers are polyhydric alcohols or mixtures thereof, such as propylene glycol, triethylene glycol, 1,3-butanediol and, most preferred, glycerine. The tobacco substrate or aerosol-forming substrate may comprise a single humectant or aerosol former. Alternatively, the tobacco substrate or aerosol-forming substrate may comprise a combination of two or more humectants or aerosol formers.

In various embodiments, the tobacco substrate or aerosol-forming substrate has a high level of humectant or aerosol former. As used herein, a high level of humectant means humectant content that is greater than about 10% or preferably greater than about 15% or more preferably greater than about 20%, by weight on a dry weight basis. The tobacco substrate or aerosol-forming substrate can also have a humectant or aerosol former content of between about 10% and about 30%, from about 15% and about 30%, or from about 20% and about 30%, by weight on a dry weight basis.

The present disclosure provides a hydrophobic wrapper disposed about or surrounding a tobacco substrate having a high humectant level. In one embodiment, the wrapper includes only a hydrophobic inner surface or at least a hydrophobic inner surface. In another embodiment, the wrapper has both a hydrophobic inner surface and a hydrophobic outer surface. It is contemplated that the hydrophobic wrapper can reduce and prevent the formation of spots that are visible to a consumer on a smoking article. It has been observed that spots appear on a smoking article upon storage where the tobacco substrate is exposed to humid conditions or moisture or where the tobacco substrate includes a high level of humectant. The spots are caused by absorption of water or humectant, including any coloured substances that are suspended or dissolved, into the web of cellulosic fibers that constitutes the paper wrapper. Without being bound by any theory, the water or humectant interacts with the cellulosic fibers of the paper and alters the organization of the fibers resulting in a local change in the optical properties, such as brightness, color, and opacity, and mechanical properties, such as tensile strength, and permeability of the paper wrapper.

Preferably, the hydrophobic wrapper is disposed about a tobacco substrate of an aerosol-generating substrate for a heated smoking article. The hydrophobic wrapper can reduce the absorption of humectant compounds and water onto the wrapper as air is drawn through the heated smoking article.

In many embodiments the overall length of the smoking article is between about 30 mm and about 130 mm. In some embodiments the overall length of the smoking article is about 85 mm or about 45 mm. The external diameter of smoking article can be between about 5.0 mm and about 12 mm, or between about 5.0 mm and about 8 mm, or 7.2 mm±10%. The overall length of the filter of the smoking article can be between about 18 mm and about 36 mm. In some embodiments the overall length of the filter is about 27 mm. Aerosol-generating substrates in heated smoking articles are typically significantly shorter in length than rods of combustible smokable material in conventional lit end smoking articles. The column of aerosol-generating substrates that is wrapped in heated smoking articles may have a length of between about 5 mm and about 20 mm.

The resistance to draw (RTD) of the smoking articles and the filters of the present disclosure can vary. In many embodiments the RTD of the smoking article is between about 50 to 130 mm $H_2O$. The RTD of a smoking article refers to the static pressure difference between the two ends of the specimen when it is traversed by an air flow under steady conditions in which the volumetric flow is 17.5 millilitres per second at the output end. The RTD of a specimen can be measured using the method set out in ISO Standard 6565:2002 with any ventilation (if present) blocked.

In one or more embodiments, smoking articles according to the present disclosure may be packaged in containers, for example in soft packs or hinge-lid packs, with an inner liner coated with one or more flavourants.

All scientific and technical terms used herein have meanings commonly used in the art unless otherwise specified. The definitions provided herein are to facilitate understanding of certain terms used frequently herein.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits under certain circumstances. However, other embodiments may also be preferred under the same or other circumstances. Furthermore, the recitation of one or more preferred embodiments does not imply that other embodiments are not useful, and is not intended to exclude other embodiments from the scope of the disclosure, including the claims.

Figure 1:
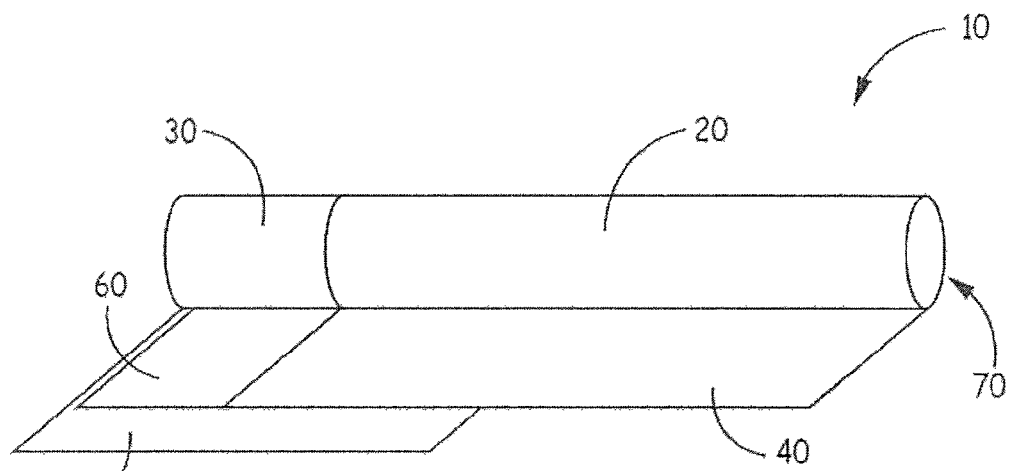
FIG. 1 is a schematic perspective view of an embodiment of a partially unrolled smoking article.
Figure 2:
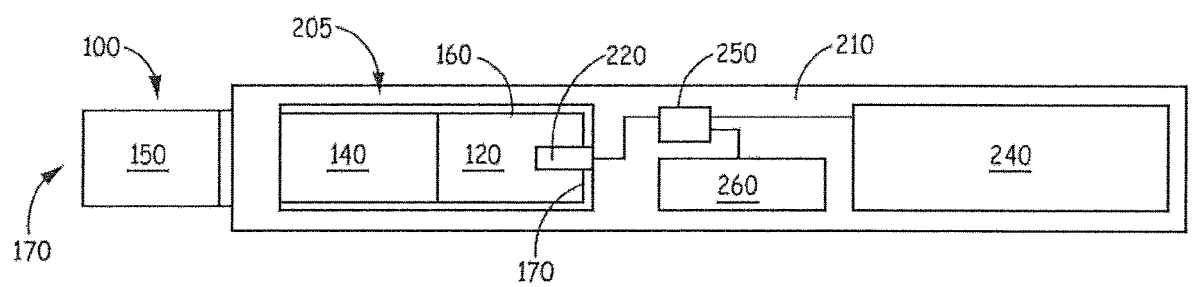
FIG. 2 is a schematic cross-sectional diagram of an embodiment of an aerosol-generating system comprising an electrically heated aerosol-generating device comprising a heating element and an aerosol-generating.

The smoking articles depicted in FIGS. 1-2 illustrate one or more embodiments of smoking articles or components of smoking articles described above. The schematic drawings are not necessarily to scale and are presented for purposes of illustration and not limitation. The drawings depict one or more aspects described in this disclosure. However, it will be understood that other aspects not depicted in the drawings fall within the scope and spirit of this disclosure.

Referring now to FIG. 1, a smoking article 10 is depicted. The smoking article 10 includes a tobacco substrate 20, such as a tobacco rod having a high level of humectant, and a mouth end segment 30 and a distal end 70. The mouthpiece 30 can abut the tobacco substrate 20 in the finished smoking article 10. The depicted smoking article 10, includes a plug wrap 60 that circumscribes at least a portion of the filter or mouthpiece segment 30 and a hydrophobic wrapper 40 that circumscribes at least a portion of the tobacco substrate 20. Tipping paper 50 or other suitable wrapper circumscribes the plug wrap 60 and a portion of the wrapper 40 as is generally known in the art.

The exemplary aerosol-generating article 100 comprises elements arranged in coaxial alignment: an aerosol-forming substrate 120, an aerosol-cooling element 140, and a mouthpiece 150. These four elements are arranged sequentially and are circumscribed by a hydrophobic wrapper 160 to form the aerosol-generating article 100. The aerosol-generating 100 has a proximal or mouth end 170, which a user inserts into his or her mouth during use, and a distal end 180 located at the opposite end of the aerosol-generating article 100 to the mouth end 170. In use, air is drawn through the aerosol-generating article 100 by a user from the distal end 180 to the mouth end 170.

The aerosol-forming substrate 120 can be located at the extreme distal or upstream end of the aerosol-generating article 100. In the embodiment illustrated in FIG. 2, aerosol-forming substrate 120 comprises homogenised tobacco material and a humectant such as glycerine as the aerosol-former.

Additional elements such as support elements to prevent the aerosol-forming substrate 120 from being forced downstream within the aerosol-generating article 100 towards the aerosol-cooling element 140 when a heating element 220 of an aerosol-generating device 210 is inserted into the aerosol-forming substrate 120, can be included (not shown).

The aerosol-cooling element 140 is located downstream of the aerosol-forming substrate 120. In use, volatile substances released from the aerosol-forming substrate 120 pass along the aerosol-cooling element 140 towards the mouth end 170 of the aerosol-generating article 100. The mouthpiece 150 is located downstream of the aerosol-cooling element 140 and can include a conventional cellulose acetate tow filter of low filtration efficiency.

The aerosol-generating device comprises a heating element 220. The heating element 220 can be mounted within an aerosol-generating article receiving chamber 205 of the aerosol-generating device 210. In use, the user inserts the aerosol-generating article 100 into the aerosol-generating article receiving chamber 205 of the aerosol-generating device 210 such that the heating element 220 is directly inserted into the aerosol-forming substrate 120 of the aerosol-generating article 100. In the embodiment shown in FIG. 3, the heating element 220 of the aerosol-generating device 210 is a heater blade.

In FIG. 2, the components of the aerosol-generating device 210 are shown in a simplified manner and not drawn to scale. The aerosol-generating device 210 comprises a housing that contains a power supply 240 and electronics 250 that allow the heating element 220 to be actuated. The heating element 220 is mounted within an aerosol-generating article receiving chamber 205 within the housing. The aerosol-generating article 100 is inserted into the aerosol-generating article receiving chamber 205 such that the heating element 220 is directly inserted into the aerosol-forming substrate 120 of the aerosol-generating article 100.

The aerosol-generating device 210 comprises an electrical energy supply 240, for example a rechargeable lithium ion battery. A controller 250 is connected to the heating element 220, the electrical energy supply 240, and a user interface 260, for example a button or display. The controller 250 controls the power supplied to the heating element 220 in order to regulate its temperature.

Once the aerosol-generating article 100 is releasably received in the aerosol-generating device 210 and on the heating element 220, the aerosol-generating device 210 is actuated to heat the aerosol-forming substrate 120 to a temperature of approximately 375 degrees Celsius. As a user draws on the mouth end 170 of the aerosol-generating article 100, the volatile compounds evolved from the aerosol-forming substrate 120 are drawn downstream through the aerosol-generating article 100 and condense to form an aerosol that is drawn through the mouthpiece 150 of the aerosol-generating article 100 into the user's mouth. The hydrophobic wrapper 160 repels humectant and moisture from the aerosol to reduce staining and weakening of the wrapper 160.

The exemplary embodiments described above are not limiting. Other embodiments consistent with the exemplary embodiments described above will be apparent to those skilled in the art.

The invention claimed is:

1. A smoking article comprising:
   a tobacco substrate comprising at least 15% by weight humectant; and
   a paper wrapper disposed about the tobacco substrate and comprising an inner surface in contact with the tobacco substrate and an outer surface,
   wherein the paper wrapper comprises at least one hydrophobic surface due to hydrophobic groups comprising fatty acid esters covalently bonded to cellulosic material of the paper,
   wherein the hydrophobic surface is formed by at least 100 discrete hydrophobic islands disposed throughout at least a downstream-most 75% portion of the paper wrapper, and
   wherein the at least one hydrophobic surface comprises the inner surface, the outer surface, or both; the plurality of discrete hydrophobic islands are not present in the most upstream 25% portion of the paper wrapper.

2. A smoking article according to claim 1, wherein the paper wrapper maintains the tobacco substrate in cylindrical form and the tobacco substrate comprises at least 20% by weight humectant.

3. A smoking article according to claim 1, wherein the paper wrapper has a water contact angle of at least about 100 degrees.

4. A smoking article according to claim 3, wherein the paper wrapper has a basis weight in a range from about 20 to about 50 grams per square meter and a hydrophobic reagent used to provide the hydrophobic groups has a basis weight in a range from about 0.1 to about 3 grams per square meter.

5. A smoking article according to claim 1, wherein the fatty acid esters are covalently bonded to cellulosic material of the paper by reacting in situ a fatty acid chloride with the cellulosic material.

6. A smoking article according to claim 5, wherein the fatty acid chloride is palmitoyl chloride, stearoyl chloride, behenoyl chloride, or a mixture of palmitoyl chloride and stearoyl chloride.

7. A smoking article according to claim 1, wherein the wrapper exhibits a Cobb measurement value (60 s) of less than 20 g/m$^2$.

8. A smoking article according to claim 1, wherein the hydrophobic paper is produced by a process comprising the steps of: applying a liquid composition comprising a fatty acid halide to at least one surface of a paper, maintaining the surface at a temperature of about 120° C. to about 180° C., wherein the fatty acid halide reacts in situ with protogenic groups of material in the paper resulting in the formation of fatty acid esters.

9. A smoking article according to claim 8, wherein the process comprises applying a liquid composition comprising stearoyl chloride or palmitoyl chloride to at least one surface of a paper at a temperature of about 120° C. to about 180° C., wherein hydroxyl groups in the cellulosic material of the paper reacts in situ with the stearoyl chloride or palmitoyl chloride.

10. A smoking article according to claim 9, wherein the process comprises applying the liquid composition to the at least one surface of a paper at a rate of in a range from about 0.1 to about 3 grams per square meter to render the at least one surface of the paper hydrophobic.

11. A smoking article according to claim 8, wherein the process comprises applying the liquid composition to the at least one surface of a paper at a rate of in a range from about 0.1 to about 3 grams per square meter to render the at least one surface of the paper hydrophobic.

12. An aerosol-generating system comprising:
   an aerosol-generating device comprising a heating element; and
   an aerosol-generating smoking article according to claim 1;
   wherein the aerosol-generating device is configured to releasably receive the aerosol-generating smoking article and the heating element provides heat to the aerosol-forming substrate of a heated smoking article.

13. A smoking article according to claim 1, wherein the paper wrapper has a basis weight in a range from about 20 to about 50 grams per square meter and a hydrophobic reagent used to provide the hydrophobic groups has a basis weight in a range from about 0.1 to about 3 grams per square meter.

14. The smoking article of claim 1, wherein the paper wrapper comprises at least one hydrophobic surface due to hydrophobic treatment, and wherein the paper wrapper comprising the at least one hydrophobic surface has a permeability that is less than 10% lower than the permeability of the paper wrapper before hydrophobic treatment.

15. The smoking article of claim 1, wherein the paper wrapper comprises a downstream end adjacent a mouth piece and an upstream end, and wherein the hydrophobic surface is present at the downstream end and is not present at the upstream end.

* * * * *